Sept. 21, 1965     J. H. FREEMAN, JR., ETAL     3,207,141
INTERNAL COMBUSTION ENGINE WITH IGNITION CELL
Filed May 14, 1963
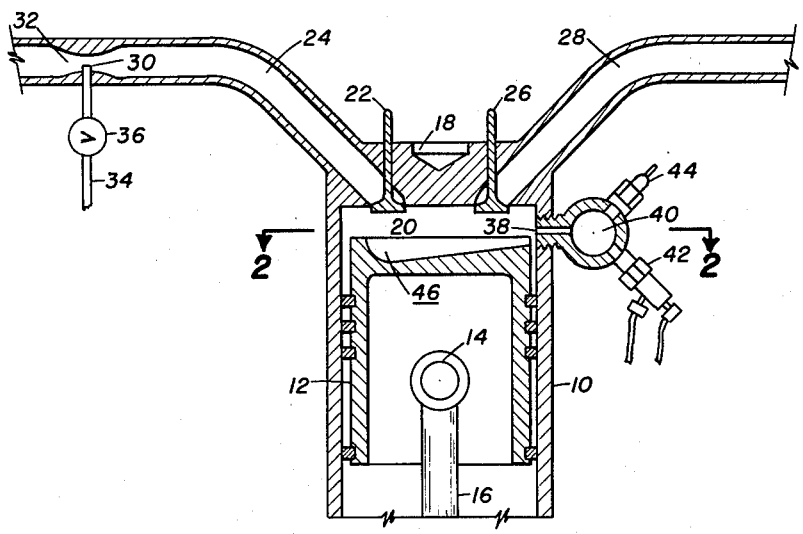
FIG. 1
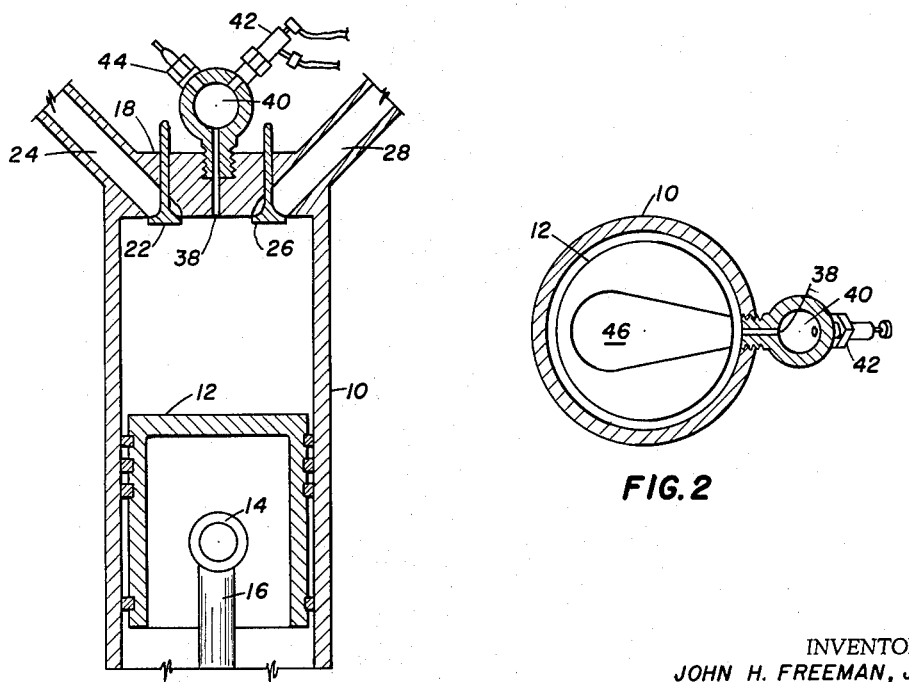
FIG. 2
FIG. 3
INVENTORS.
JOHN H. FREEMAN, JR.
WILSON D. DYSART
BY
ATTORNEY.

United States Patent Office 3,207,141
Patented Sept. 21, 1965

3,207,141
INTERNAL COMBUSTION ENGINE WITH IGNITION CELL
John H. Freeman, Jr., and Wilson D. Dysart, Crystal Lake, Ill., assignors to The Pure Oil Company, Palatine, Ill., a corporation of Ohio
Filed May 14, 1963, Ser. No. 280,239
10 Claims. (Cl. 123—143)

This invention relates to stratified-charge internal combustion engines with turbulent-flame ignition and, more particularly, to an improved divided-chamber, stratified-charge internal combustion engine.

The history of the development of spark-ignited internal combustion engines has shown an almost continuous rise in compression ratio as designers have sought to exploit the gains in specific output and engine deficiency indicated by thermodynamic theory to be obtainable. However, as the compression ratio has been raised, practical difficulties such as spark knock, "rumble" (high rate of pressure rise), and uncontrolled combustions, have been encountered. Of equal or greater importance, the homogeneous charge, spark-ignition engines in use today suffer in efficiency when operated at part-load, primarily because of the necessity to partially throttle the air entering the combustion chamber. It is well known that combustion knock, which often occurs during the operation of spark-ignition engines, results from autoignition in a portion of the homogeneous mixture charge ahead of the advancing reaction front initiated at the spark plug. The phenomenon is often called "spark knock" because the probability of its occurrence is highly dependent upon spark timing. In any given case, the probability of the occurrence of spark knock is also highly dependent upon the octane rating of the fuel. The site of autoignition which is responsible for spark knock is called the end-gas region of the combustion chamber. Because this form of autoignition occurs only ahead of the advancing reaction front, the end gas region is normally remote from the spark plug location.

Combustion knock is undesirable because it is often accompanied by loss of power and thermal efficiency. This is particularly true for carbureted multiple cylinder engines. In addition, combustion knock, as a precursor of destructive preignition, can also jeopardize the engine structure.

The latent shortcomings of the ordinary type of spark-ignition engines have focused attention upon other engines such as stratified-charge engines. Stratified-charge engines are of two fundamental types, which are
(1) Charge stratification within a single combustion chamber achieved by means of carefully directed air swirls and fuel injection, and
(2) Charge stratification by means of a divided combustion chamber.

The part-load advantages of stratified-charge engines with respect to the throttled, homogeneous-charge type are
(1) Part-load pumping losses are reduced because gas flows are not intentionally throttled to regulate load,
(2) Radiation and combustion chamber convection losses are reduced at part-load because of the lower working fluid temperatures,
(3) The lower part-load fluid temperatures are also conducive to reduced chemical disassociation during reaction, resulting in higher thermal efficiency,
(4) Part-load combustion efficiency is improved because of excess available air, and
(5) Part-load efficiency is improved by virtue of the thermodynamic advantage of lower ratio of specific heats for the working fluid.

Single-chamber, stratified-charge engines have an additional advantage over divided-chamber engines known in the art, in that the latter engines have a tendency to knock at, or near, full load (100% theoretical fuel), resulting in a high octane requirement. On the other hand, one disadvantage of single-chamber, stratified-charge engines is the inability to achieve the full heat release commensurate with the air pumped by the engine. This is a consequence of imperfect full-load air utilization, and is characterized by the inability to burn mixtures from about 85 to 120% theoretical fuel without intolerable smoke production. A second disadvantage is low volumetric efficiency imposed by the requirement for a shrouded inlet valve.

The disadvantages cited for both types of stratified-charge combustion chambers result from insufficient turbulence. Inherently, the open chamber cannot be made turbulent since stratification will suffer, and the divided chamber cannot use a small, turbulent corridor since volumetric efficiency will suffer.

The Schlamann engine, which is a divided-chamber, stratified-charge engine described in U.S. Patent 2,758,576 also suffers from poor air utilization (limited at 80% of stoichiometric fuel-air ratio) because it becomes knock-limited at high loads. The Schlamann engine, which is somewhat similar to the engine of the instant invention, is essentially a piston engine of the usual type with inlet and exhaust valves communicating directly with the cylinder. The clearance space above the piston crown comprises the major portion of the compression volume and a precombustion chamber is provided to complete the compression volume via a connecting passage. The smaller of the two chambers is fitted with a fuel injection nozzle and a spark plug, so that a nearly homogeneous, combustible mixture may be created and ignited within its volume. Fuel, which is aspirated into the unthrottled intake air stream according to engine load, is caused to react with available (and usually excess) air in the larger chamber by means of appropriately timed emission of hot reaction products from the precombustion chamber. Such an engine differs from other divided-chamber, stratified-charge engines primarily with respect to the scavenging of the precombustion chamber. In otherwise similar engines the inlet valve is always situated in the ignition cell to assure good scavenging, but a rather large passageway to the main combustion chamber is required to provide acceptable volumetric efficiency.

In the operation of divided-chamber, stratified-charge engines known in the art, the effluent of hot reaction products which emerges from the precombustion chamber into the main combustion chamber acts in a manner analogous to the spark plug of a homogeneous-charge engine. That is, flame propagation is relied upon to an extent for consummation of the main-chamber reaction. Reliance on a degree of flame propagation is seen in the Schlamann engine as the desirability to incorporate some mixture throttling at or near idle. In other words, a lean limit of reliable, efficient main-chamber combustion exists for the Schlamann engine. It also exists for other divided-chamber, stratified-charge engines, as noted independently by workers other than Schlamann, in connection with discontinuities of the light-load specific fuel consumption characteristic of their divided-charge, stratified-charge engines.

It is, therefore, the primary object of this invention to combine the knock resistance associated with diffusional combustion engines (compression-ignition and single-chamber, stratified-charge) with the excellent air utilization associated with homogeneous combustion engines (homogeneous-charge, spark-ignition). Another object of this invention is to provide a divided-chamber, stratified-charge engine wherein lean mixtures can be ignited satisfactorily, with accompanying improvement in light-load specific-fuel consumption. Another object of this invention is to provide a divided-chamber, stratified-charge engine with which combustion efficiencies, even at part-load, that are superior to those obtained with comparable conventional engines, can be obtained. Still another object of this invention is to provide a divided-chamber, stratified-charge engine wherein spark knock appears to be absent, even at 12.5:1 compression ratios, regardless of the fuel burned or the load. A further object of this invention is to provide a divided-chamber, stratified-charge engine wherein fuel octane rating appears to have no influence on noise-free performance, i.e., rate of pressure rise. A still further object of this invention is to provide a divided-chamber, stratified-charge engine which can use distillate fuels ranging from high-octane gasolines to high-cetane diesel fuels equally well at moderate compression ratios (7–8:1). These and further objects of this invention will become apparent as the description thereof herein proceeds, and reference is made to the accompanying drawings in which:

FIGURE 1 is a vertical sectional view of the upper portion of a four cycle engine cylinder of this invention, FIGURE 2 is a section on line 2—2 of FIGURE 1, and FIGURE 3 is a vertical sectional view of the upper portion of an alternative embodiment of a four cycle engine cylinder of this invention.

In accordance with this invention, all of the above-discussed disadvantages of the divided-chamber, stratified-charge engines known in the art are obviated by using charge stratification of the Schlamann type suitably proportioned to maximize turbulence and insure wide-spread ignition of the main combustion chamber charge. This can be called a stratified-charge combustion chamber with turbulent-flame ignition. The turbulent-flame ignition is achieved by constructing the engine so that the main combustion volume is located as compactly as possible in line with the narrow orifice which divides the combustion chamber, the narrow orifice being of critical dimensions. The design of the engine of this invention results in the thorough diffusion of the ignition cell combustion charge throughout the main combustion chamber, thus assuring wide-spread inflammation of the main charge. When compression turbulence is introduced and augmented by means of the turbulent ignition effluent demanded by the widespread ignition requirement, mass burning rates become extremely high. The transfer of combustion from the ignition cell to the main combustion chamber and the presence of an end-gas, both described by Schlamann, are thereby obviated, even at full air utilization. Rather, the energy of the ignition gases is thoroughly diffused throughout the main combustion space, and combustion takes place almost simultaneously throughout the main combustion chamber. The combustion is extremely rapid, and it, in effect, consumes the end-gas before the precombustion reaction precursors of autoignition can be completed. The rapid, almost constant-volume combustion, leads to high thermal efficiency because of reduced polytropic deviation during the expansion process. However, peak combustion pressures are of the same magnitude associated with the compression-ignition engine. Therefore, adherence to the design practice developed for compression-engines, with respect to cylinder block, crankcase, crankshaft, connecting rods, pistons, piston rings and bearings, etc., is preferred.

The best torque spark advance angles required by the engine of this invention emphasize the rapid burning rates which characterize turbulent-flame ignition as described above. At piston speeds of 2,400 feet per minute, for example, the best torque spark advance is about ten degrees before top center, or about one-third that usually required for a conventional spark-ignition engine. Such high burning rates are conducive to good thermal efficiency, as they correspond more closely to the constant high-volume heat addition of the ideal Otto cycle. However, they necessarily impose mechanical loadings which render a rigid engine structure desirable.

The ignition cell is preferably of a shape having a low surface-to-volume ratio, as for example, it may be cylindrical, or, preferably, spherical. The size of the ignition cell is somewhat dependent on the friction mean effective pressure of the engine in question, so as to provide the energy necessary to run the engine at idle. For example, the size of the ignition cell of a cylinder having a full-load indicated mean effective pressure of 140 p.s.i.g. and a friction mean effective pressure of 21 p.s.i.g. will ideally be (21/140) (100) or 15% of the total combustion chamber volume. However, the ignition cell volumes may vary over a wide range, both larger and smaller than specified by the preceding formula, to suit individual purposes, but in general will represent about 5–35% of the total compression volume.

The location in the ignition cell of the means to ignite the ignition cell charge, e.g., a conventional spark plug, is not critical, and it may be located near the ignition cell injection nozzle. However, to the extent that design conditions permit, it is desirable to locate the spark plug as close to the communicating orifice as possible. Frame propagation is relied upon within the ignition cell, and it is desirable that the flame travel oppose the flow of turbulent ignition effluent from the ignition cell. In this way the undesirable expulsion of unburned ignition cell charge out into the main combustion chamber is minimized. If desired, hot tube, or so-called "glow plug" ignition may be used to supplant a spark plug in the ignition cell, and related high tension electric ignition equipment.

Because gas flow will be turbulent in either direction through the orifice, the location of the injection nozzle in the ignition cell is not critical. In general, the timing of the injection is not critical, and large variations in timing have no perceptible effect on results. A setting of 90° before top center, injector port closing, compression stroke, has proved ideal. However, injection timing is important when hot tube ignition is utilized, as the pilot charge will tend to burn as a diffusion flame upon striking the hot ignition seat.

The main combustion chamber volume may be contained within the cylinder head, the piston crown, or both the cylinder head and piston crown. To simplify the engine design, it is preferred that part (viz, at least 50%) of the main combustion chamber volume be contained within an elongated cavity in the piston crown and the communicating orifice open through the side wall of the cylinder. If at least a portion of the main combustion chamber volume is within a piston crown cavity, the major axis of the piston crown cavity must be substantially in line with the axis of the orifice, i.e., the major axis of the piston crown cavity must be substantially coincident with the extension of the communicating orifice axis, when the piston is at such a position that the two axes are in the same plane. The piston crown cavity preferably extends from the communicating orifice beyond the center of the piston to the maximum extent consistent with adequate structural strength. A satisfactory shape of the piston crown cavity is arcuate in cross-section, increasing in size as the cavity extends from the communicating orifice (e.g., a semi-conical shape defined by a plane coincident with the axis of a cone), and then rapidly decreasing in size near the end of the cavity.

The communicating orifice physically divides the combustion chamber in a manner such that a nearly homogenous mixture charge can be established in the ignition cell, regardless of the state of the mixture in the main combustion chamber. It is especially important that the orifice be a relatively long, thin opening to achieve the objectives of this invention. The communicating orifice may be of any suitable cross-section, such as cylindrical, triangular, rectangular, hexagonal, etc. More specifically, communicating orifices having cross-sectional areas in the range of about 0.012 to 0.025 square inch and lengths in the range of about 0.35 to 0.90 inch are preferred. Cylindrical communicating orifices having diameters in the range of about 0.125 to 0.177 inch, and length:diameter ratios in the range from about 3:1 to 5:1 are especially preferred. In general, communicating orifices of the above dimensions are useful for cylinders having displaced volumes in the range of about 20–60 cubic inches.

Gaseous, volatile liquid, and distillate hydrocarbons, ranging from methane through the boiling range of compression ignition fuels are suitable for use as primary fuels in the engine of this invention. Any fuel in this range may be applied as pilot fuel to the ignition cell via any form of timed fuel injection, such as that described by Schlamann, or otherwise well known to the art, with the exception that a gas admission valve must be employed when gaseous fuels are used.

The engine of this invention may be operated with different main fuel-metering systems, e.g., continuous injection into the induction pipe, timed induction pipe injection, and direct cylinder injection. While the autoignition of the end-gas at or near full load is obviated by this design, it will be apparent that the possibility of autoignition of the main charge at some point during the compression process and before ignition still exists. Such autoignition will be especially probable under extremely severe conditions, such as, high compression ratios, high induction air temperature and/or pressure, high cylinder jacket temperature, or operation with fuels of very low octane rating. In such cases, direct cylinder injection of the main combustion charge will be beneficial in the same way that it is beneficial for conventional engines; namely, reduced mixture residence time. The greatest anti-knock benefit for the turbulent flame combustion system of this invention may therefore be demonstrated using direct main charge injection. For example, at a 12.6:1 compression ratio, sixty percent full load, and cylinder injection at 30° before top center, compression stroke, no significant differences can be noted in the combustion characteristics of normal heptane and isooctane containing three millimeters of tetraethyl lead per gallon. This comparison incorporates nearly the widest spread in fuel anti-knock qualities possible, 115 octane numbers. In this case sixty percent of full load means 86.4 p.s.i.g. indicated mean effective pressure. The corresponding conventional engine would be knock-limited at about 79 p.s.i.g. indicated mean effective pressure when fueled with commercial gasoline of 99 research octane rating. Other characteristics of the stratified-charge engine of this invention are discussed in the paper entitled "Characteristics of a Stratified-Charge Engine With Turbulent-Flame Ignition" by W. D. Dysart and J. H. Freeman Jr., presented on May 16, 1962 during a session of the twenty-seventh mid-year meeting of the American Petroleum Institute's Division of Refining in San Francisco, California, which is hereby incorporated by reference.

Referring to FIGURES 1 and 2, the numeral 10 represents a single cylinder of a four-cycle engine of this invention in which piston 12 is reciprocally mounted. Piston 12 is attached by piston pin 14 to connecting rod 16, which is in turn connected to the usual crankshaft (not shown). Defined between piston 12 when it is in top dead-center position, as shown in FIGURE 1, and cylinder head 18 is main combustion chamber 20. Cylinder head 18 has intake valve 22 for controlling influx of air from passage 24 and exhaust valve 26 for controlling the exodus of spent or burnt products of combustion through passage 28. Intake valve 22 and exhaust valve 26 are operated from the usual camshaft (not shown). Intake passage 24 includes means for mixing air with a suitable fuel, e.g., gasoline, such as fuel nozzle 30 located in constriction 32. As in the case of the Schlamann engine, the fuel line 34, which leads to nozzle 30, includes throttle valve 36 to control the rate at which fuel is supplied to nozzle 30 independently of the rate of flow of air.

Communicating with combustion chamber 20 at a suitable point through the cylinder head through orifice 38 is precombustion chamber, or ignition cell, 40. Orifice 38, which is illustrated as being substantially normal to the axis of cylinder 10, is preferably cylindrical in cross-section and has a diameter in the range of about 0.125 inch to 0.177 inch with a length to diameter ratio from about 3–5:1. Ignition cell 40 is preferably of a shape and size that it has a low surface-to-volume ratio, e.g., spherical, and its volume preferably constitutes between about 15 to 35% of the total combustion chamber volume, i.e., the sum of the volumes of chambers 20 and 40, when piston 12 is at top dead-center. Ignition cell 40 is provided with fuel injection device 42 and a suitable device for igniting the charge in ignition cell 40, e.g., spark plug 44. It will be apparent that orifice 38 and ignition cell 40 can be constructed as a part of the cylinder head, or contained within a casing provided with a threaded extension which is adapted to enter a threaded opening in the cylinder head, as shown in FIGURE 1. If the spark plug opening in the cylinder in a conventional engine is suitably located, the threaded extension of the casing may be threaded in the spark plug opening.

The crown of piston 12 is provided with an elongated recess 46, which extends from orifice 38 when piston 12 is at top dead-center. Orifice 38 is located so that the axis of orifice 38 is substantially normal to the axis of cylinder 10. Cavity 46 increases in depth and width as it extends from orifice 38 beyond the center of piston 12.

In the operation of the engine of this invention, during the intake stroke of piston 12 with exhaust valve 26 closed, intake valve 22 is opened and an air fuel mixture is admitted into the main combustion chamber 20. Intake passage 24 is constructed to admit substantially constant charges of air during each intake stroke, regardless of the engine load, while valve 36 is adjusted as the engine load increases to increase the amount of fuel admitted into intake passage 24 through nozzle 30, and thereby introduce a richer air-fuel (becoming about 100–120% stoichiometric fuel-air ratio at full load) mixture into cylinder 10. During the compression stroke of cylinder 12, intake valve 22 is closed and a portion of the air-fuel mixture in cylinder 10 is forced through orifice 38 into ignition cell 40. The fuel-air mixture which is forced into the ignition cell 40 is then combined with a fuel admitted into ignition cell 40 from injection device 42 in an amount and at a temperature and pressure to form a rich, readily ignitable, mixture under all conditions of power demand. It will be evident that the amount of fuel directly injected into ignition cell 40 will be reduced proportionately as the amount of fuel injected from nozzle 30 is increased. At about the end of the compression stroke, spark plug 44 is fired to ignite the rich mixture in ignition cell 40. The hot combustion gases, or flame, in ignition cell 40 expand through orifice 38 into combustion chamber 20 and ignite the main body of the fuel-air mixture to initiate the power stroke.

A vertical sectional view of a four cycle engine cylinder of this invention having the axis of the cylinder coincident with the axis of the communicating orifice is shown in FIGURE 3. Referring to FIGURE 3, reciprocally mounted in cylinder 10 is piston 12 which is attached by piston pin 14 to connecting rod 16. Connecting rod 16 is connected to the usual crankshaft (not shown). Defined between piston 12 when it is in top dead-center position, and cylinder head 18 is main combustion chamber 20.

Cylinder head 18 is provided with intake valve 22 and exhaust valve 26 for controlling influx from passage 24 and exhaust through passage 28, respectively. Passage 24 includes means for mixing air with a suitable fuel and means for controlling the rate at which the fuel is introduced into passage 24 as described with respect to FIGURES 1 and 2.

Communicating with combustion chamber through orifice 38 in cylinder head 18 is ignition cell 40. Orifice 38 and ignition 40 are located such that the axis of orifice 38 is coincident with the axis of cylinder 10 (and piston 12). Orifice 38 is preferably cylindrical in cross-section and has a diameter in the range of about 0.125 inch to 0.177 inch. The length of orifice 38 is preferably about 3 to 5 times its diameter. Ignition cell 40, which constitutes about 5 to 35%, preferably about 15 to 35%, of the total combustion volume is spherically shaped. Provided in ignition cell 40 are fuel injection nozzle 42 and spark plug 44.

The operation of this embodiment is the same as outlined with respect to the embodiment illustrated in FIGURES 1 and 2.

While this invention has been described in relation to specific embodiments, it will be evident that obvious modifications may be made by one skilled in the art without departing from the intended scope of this invention. For example, this invention may be used with two-stroke engines, as well as four-stroke engines.

The embodiments of this invention in which an exclusive property or privilege is claimed are defined as follows:

1. In an internal combustion engine, a cylinder having a flat head, a piston reciprocally mounted in said cylinder, a combustion chamber defined by said cylinder and piston at top dead-center, means for introducing a fuel-air mixture into said combustion chamber, an ignition chamber smaller than said combustion chamber and communicating with said combustion chamber through an orifice, said orifice having a cross-sectional area within the range of about 0.012 to 0.025 square inch and a length within the range of about 0.35 to 0.90 inch, whereby fluids may enter said ignition chamber upon the compression stroke of said cylinder, said orifice being positioned such that the center thereof is substantially in line with the axis of said cylinder, means for introducing a fuel into said ignition chamber at a temperature and pressure such that said fuel forms an ignitable mixture with a portion of said fuel-air mixture, and means for igniting said fuel-air mixture.

2. An internal combustion engine in accordance with claim 1 in which said orifice is cylindrical in cross-section and has a diameter in the range of about 0.125 to 0.177 inch and a length:diameter ratio in the range of about 3:1 to 5:1.

3. In an internal combustion engine, a cylinder, a piston reciprocally mounted in said cylinder, a combustion chamber defined by said cylinder and piston at top dead-center, the crown of said piston having a recess defining at least a portion of said combustion chamber, means for introducing a fuel-air mixture into said combustion chamber, an ignition chamber smaller than said combustion chamber and communicating with said combustion chamber through an orifice, said orifice having a cross-sectional area within the range of about 0.012 to 0.25 square inch and a length within the range of about 0.35 to 0.90 inch, said orifice being positioned substantially normal to the axis of said cylinder.

4. An internal combustion engine in accordance with claim 3 in which said recess forms at least 50% of said combustion chamber.

5. An internal combustion engine in accordance with claim 4 in which said recess is an elongated recess having its major axis extending in line with said orifice when said piston is at top dead-center.

6. An internal combustion engine in accordance with claim 5 in which a major portion of said recess is arcuate in cross-section, increasing in size as it extends from said orifice.

7. An internal combustion engine in accordance with claim 3 in which said recess is an elongated recess having its major axis extending in line with said orifice when said piston is at top dead-center.

8. An internal combustion engine in accordance with claim 2 in which said ignition chamber is between about 5 to 35% of the total volume of said combustion chamber and ignition chamber.

9. An internal combustion engine in accordance with claim 2 in which said ignition chamber is between about 15 to 35% of the total volume of said combustion chamber and ignition chamber.

10. In an internal combustion engine, a cylinder, a piston reciprocally mounted in said cylinder, a combustion chamber defined by said cylinder and piston at top dead-center, the crown of said piston having an elongated recess having its major portion arcuate in cross-section and defining at least 50% of said combustion chamber, said recess being further characterized as having its major axis extending in line with an orifice, hereinafter defined, when said piston is at top dead-center, an ignition chamber smaller than said combustion chamber and comprising about 5 to 35% of the total volume of said combustion chamber and ignition chamber, said ignition chamber communicating with said combustion chamber through an orifice, said orifice having a cross-sectional area within the range of about 0.012 to 0.025 square inch and a length within the range of about 0.35 to 0.90 inch, said orifice being positioned substantially normal to the axis of said cylinder.

References Cited by the Examiner

UNITED STATES PATENTS

| | | | |
|---|---|---|---|
| 1,957,541 | 5/34 | Johnson | 123—143 |
| 2,758,576 | 8/56 | Schlamann | 123—32 |
| 2,803,230 | 8/57 | Bensinger | 123—32 |
| 2,914,043 | 11/59 | Nallinger | 123—32 |
| 3,066,661 | 12/62 | May | 123—143 |
| 3,066,662 | 12/62 | May et al. | 123—143 |

RICHARD B. WILKINSON, *Primary Examiner.*